United States Patent
Jaw

(10) Patent No.: US 10,183,205 B2
(45) Date of Patent: Jan. 22, 2019

(54) SLIP-PROOF GRIP SLEEVE AND METHOD FOR MAKING THE SAME

(71) Applicant: Leo Jaw, Taichung (TW)

(72) Inventor: Leo Jaw, Taichung (TW)

( * ) Notice: Subject to any disclaimer, the term of this patent is extended or adjusted under 35 U.S.C. 154(b) by 0 days.

(21) Appl. No.: 15/822,421

(22) Filed: Nov. 27, 2017

(65) Prior Publication Data

US 2018/0296894 A1    Oct. 18, 2018

(30) Foreign Application Priority Data

Apr. 14, 2017    (TW) ............................. 106112676 A

(51) Int. Cl.
  *A63B 53/14*    (2015.01)
  *A63B 60/14*    (2015.01)
  *A63B 102/32*    (2015.01)

(52) U.S. Cl.
  CPC .......... *A63B 60/14* (2015.10); *A63B 2102/32* (2015.10); *A63B 2209/00* (2013.01)

(58) Field of Classification Search
  CPC .. A63B 60/14; A63B 2209/00; A63B 2102/32
  See application file for complete search history.

(56) References Cited

U.S. PATENT DOCUMENTS

| | | | |
|---|---|---|---|
| 2,050,176 A * | 8/1936 | Hammerich | D06F 79/00 15/244.4 |
| 3,366,384 A | 1/1968 | Lamkin et al. | |
| 5,890,972 A * | 4/1999 | Huang | A63B 49/08 473/302 |
| 6,641,488 B2 * | 11/2003 | Huang | A63B 53/14 473/302 |
| 6,815,028 B2 * | 11/2004 | Huang | A63B 53/14 428/40.1 |
| 7,195,566 B2 * | 3/2007 | Chang | A63B 49/08 473/300 |
| 8,226,497 B2 * | 7/2012 | Chu | A63B 53/14 473/300 |
| 8,480,508 B2 * | 7/2013 | Chu | A63B 53/14 473/298 |
| 9,358,437 B2 * | 6/2016 | Ehlers | B29C 70/30 |
| 9,375,833 B2 * | 6/2016 | Huang | A01K 87/08 |
| 9,440,128 B2 * | 9/2016 | Huang | B29C 59/02 |
| 9,661,833 B2 * | 5/2017 | Huang | A01K 87/08 |

(Continued)

*Primary Examiner* — Stephen Blau
(74) *Attorney, Agent, or Firm* — Alan D. Kamrath; Kamrath IP Lawfirm, P.A.

(57) ABSTRACT

A slip-proof grip sleeve includes a lining tube and a slip-proof strip mounted on an outer periphery of the lining tube. The slip-proof strip includes a gripping portion between front and rear ends thereof. The slip-proof strip further includes a first folding portion adjacent to the rear end and a second folding portion adjacent to the gripping portion. The first and second folding portions are thinner than a thickness of the gripping portion. The first folding portion is folded toward an inner face of the slip-proof strip to overlap with the second folding portion. The slip-proof strip includes a third folding portion adjacent to the front end and a fourth folding portion adjacent to the gripping portion. The third and fourth folding portions are thinner than the thickness of the gripping portion. The third folding portion is folded toward the inner face to overlap with the fourth folding portion.

5 Claims, 10 Drawing Sheets

(56) References Cited

U.S. PATENT DOCUMENTS

| | | | | |
|---|---|---|---|---|
| 2001/0046905 A1* | 11/2001 | Huang | ................... | A63B 60/14 |
| | | | | 473/300 |
| 2003/0215629 A1* | 11/2003 | Chen | ...................... | A63B 49/08 |
| | | | | 428/343 |
| 2004/0029645 A1* | 2/2004 | Chen | ...................... | A63B 53/14 |
| | | | | 473/300 |
| 2005/0079924 A1* | 4/2005 | Heinecke | ............... | A63B 53/14 |
| | | | | 473/300 |
| 2007/0015599 A1* | 1/2007 | Yang | ...................... | A63B 53/14 |
| | | | | 473/300 |
| 2009/0268992 A1* | 10/2009 | Brouwer | ................ | A45C 11/22 |
| | | | | 383/63 |
| 2012/0124739 A1* | 5/2012 | Crowne | ................ | A47G 9/062 |
| | | | | 5/417 |
| 2012/0283035 A1* | 11/2012 | Wang | ..................... | A63B 60/00 |
| | | | | 473/298 |
| 2015/0196814 A1* | 7/2015 | Chu | ....................... | A63B 53/14 |
| | | | | 473/300 |
| 2016/0257065 A1* | 9/2016 | Moreau | .................... | B25H 3/00 |
| 2016/0287958 A1* | 10/2016 | Wang | ..................... | A63B 60/14 |

\* cited by examiner

SLIP-PROOF GRIP SLEEVE AND METHOD FOR MAKING THE SAME

BACKGROUND OF THE INVENTION

The present invention relates to a grip sleeve and, more particularly, to an slip-proof grip sleeve and a method for making the slip-proof grip sleeve.

U.S. Pat. No. 8,480,508 (CN Patent Application No. 201210348141.3) discloses a golf club grip including a resilient inner sleeve, a single sheet, an axial seam strip, and a combination of adhesives. The single sheet is wrapped around and adhered onto the resilient inner sleeve's body and has its top and bottom circumferential margins respectively over the resilient inner sleeve's cap underside edge and retaining sidewall edge, and two axial margins forming an axial gap along the length of the resilient inner sleeve's body. The combination of adhesives includes a pressure sensitive adhesive and a structural adhesive. The pressure sensitive adhesive is used to adhere the single sheet onto the resilient inner sleeve's body. The structural adhesive is applied in the axial gap covered with the axial seam strip to form an axial seam structure.

However, a sealing action must be carried out after the single sheet is adhered onto the resilient inner sleeve's body. This sealing action includes use of a rigid plate-like member (such as a body of a butter knife) to insert a margin of the single sheet adjacent to the cap into a gap between the tubular body and the cap, thereby avoiding generation of burrs at the margin of the single sheet and exposure of the burrs.

In addition to adhering after wrapping the tubular body with the single sheet, another approach is rolling a piece of leather into a tubular shape, sewing the tubular shape into a leather tube, and slipping the sewed leather tube to a position around a shaft.

U.S. Pat. No. 3,366,384 entitled "GOLF CLUB GRIP AND METHOD FOR MAKING SAME" discloses a method for applying a leather golf club grip to a golf club shaft includes the steps of affixing an underlisting to the grip end of the golf club shaft, forming a leather gripping surface for the underlisting by skiving a single piece of leather to form a bevel along two of its edges and forming the piece of leather into a tubular shape by sewing the two skived edges together, the edges projecting inwardly toward the interior thereof, and applying the leather gripping surface to the underlisting, by slipping it over the club head end of the shaft and onto the underlisting prior to affixing the club head to the shaft. A cap is mounted to an end of the shaft and includes a conic surface abutting the bevel of the piece of leather and corresponding to the inclined surface of the shaft.

However, when using the above structure to make the golf club grip, the piece of leather must be trimmed before coupling the cap to the end of the shaft. Otherwise, the piece of leather will still be uneven, and the structure of the shaft and the cap are complicated.

Furthermore, after a long period of use and application of forces on the golf club grips formed by the above two methods, the adherence effect deteriorates, such that the margin of the single piece and the bevel of the piece of leather are apt to disengage from the resilient inner sleeve and the underlisting, respectively. Thus, the margin of the single piece and the bevel of the piece of leather are exposed, and burrs are formed.

Thus, a need exists for a novel slip-proof grip sleeve and a method for making the slip-proof grip sleeve to overcome the disadvantages of the above conventional structures.

BRIEF SUMMARY OF THE INVENTION

An objective of the present invention is to provide a slip-proof grip sleeve including a lining tube and a slip-proof strip mounted on an outer periphery of the lining tube. The slip-proof strip includes an inner face and an outer face opposite to the inner face. The slip-proof strip further includes a rear end and a front end opposite to the rear end. The slip-proof strip further includes a gripping portion between the rear end and the front end. The slip-proof strip further includes a first folding portion adjacent to the rear end and a second folding portion at a side of the first folding portion adjacent to the gripping portion. Each of a thickness of the first folding portion and a thickness of the second folding portion is smaller than a thickness of the gripping portion. The first folding portion is folded in a direction toward the inner face. The first folding portion and the second folding portion overlap with each other. The slip-proof strip includes a third folding portion adjacent to the front end and a fourth folding portion at a side of the third folding portion adjacent to the gripping portion. Each of a thickness of the third folding portion and a thickness of the fourth folding portion is smaller than the thickness of the gripping portion. The third folding portion is folded in the direction toward inner face. The third folding portion and the fourth folding portion overlap with each other.

In an example, the first folding portion and the second folding portion are glued together by glue disposed therebetween, and the third folding portion and the fourth folding portion are glued together by glue therebetween.

In an example, the first folding portion and the second folding portion are contiguous to each other. The first folding portion of the slip-proof strip is folded in the direction toward the inner face along an intersection between the first folding portion and the second folding portion. The third folding portion and the fourth folding portion are contiguous to each other. The third folding portion of the slip-proof strip is folded in the direction toward the inner face along an intersection between the third folding portion and the fourth folding portion.

In an example, the lining tube is a hollow cylindrical tube. A rear cap is mounted to an end of the lining tube. A ring is mounted to another end of the lining tube opposite to the rear cap. The slip-proof strip is rolled to form a cylindrical tube. The inner face faces inward. Two opposite sides of the slip-proof strip are connected to each other. The rear end of the slip-proof strip abuts the rear cap by the outer face. The rear end of the slip-proof strip does not overlap with the rear cap. The front end of the slip-proof strip abuts the ring by the outer face. The front end of the slip-proof strip does not overlap with the ring.

In an example, a maximum width of the rear cap in a diametric direction is larger than a maximum width of the lining tube in the diametric direction. A maximum width of the ring in the diametric direction is larger than the maximum width of the lining tube in the diametric direction. A maximum width of the rear end of the slip-proof strip in the diametric direction is smaller than the maximum width of the rear cap in the diametric direction. A maximum width of the front end of the slip-proof strip in the diametric direction is smaller than the maximum width of the ring in the diametric direction.

A method for making a slip-proof grip sleeve according to the present invention includes:

preparing a slip-proof strip, wherein the slip-proof strip includes an inner face and an outer face opposite to the inner face, wherein the slip-proof strip further includes a rear end and a front end opposite to the rear end, wherein the slip-proof strip further includes a gripping portion between the rear end and the front end;

skiving the inner face of the slip-proof strip at a location adjacent to the rear end of the slip-proof strip, forming a first folding portion and a second folding portion at a side of the first folding portion adjacent to the gripping portion, wherein each of a thickness of the first folding portion and a thickness of the second folding portion is smaller than a thickness of the gripping portion;

skiving the inner face of the slip-proof strip at a location adjacent to the front end of the slip-proof strip, forming a third folding portion and a fourth folding portion at a side of the third folding portion adjacent to the gripping portion, wherein each of a thickness of the third folding portion and a thickness of the fourth folding portion is smaller than the thickness of the gripping portion;

applying glue to at least one of a side of the first folding portion adjacent to the inner face and a side of the second folding portion adjacent to the inner face, and applying glue to at least one of a side of the third folding portion adjacent to the inner face and a side of the fourth folding portion adjacent to the inner face; and folding the first folding portion in a direction toward the inner face to overlap the first folding portion with the second folding portion, and folding the third folding portion in the direction toward inner face to overlap the third folding portion with the fourth folding portion.

In an example, the method further includes rolling the slip-proof strip into a tube, with the inner face forming an inner periphery of the tube, with two opposite sides of the slip-proof strip interconnected to each other.

In an example, the method further includes an assembling step including mounting a rear cap to an end of the lining tube; mounting a ring to another end of the lining tube opposite to the rear cap, wherein the lining tube, the rear cap and the ring are an integrated structure; and mounting the slip-proof strip around an outer periphery of the lining tube, with the rear end of the slip-proof strip abutting the rear cap by the outer face, and with the front end of the slip-proof strip abutting the ring by the outer face.

In an example, in the assembling step the lining tube is a hollow cylindrical tube. A maximum width of the rear cap in a diametric direction is larger than a maximum width of the lining tube in the diametric direction. A maximum width of the ring in the diametric direction is larger than the maximum width of the lining tube in the diametric direction. The rear end of the slip-proof strip does not overlap with the rear cap. The front end of the slip-proof strip does not overlap with the ring. A maximum width of the rear end of the slip-proof strip in the diametric direction is smaller than the maximum width of the rear cap in the axial direction. A maximum width of the front end of the slip-proof strip in the diametric direction is smaller than the maximum width of the ring in the diametric direction.

In an example, the first folding portion and the second folding portion are contiguous to each other. The third folding portion and the fourth folding portion are contiguous to each other. Folding the first folding portion includes folding the first folding portion in the direction toward the inner face about an intersection between the first folding portion and the second folding portion. Folding the third folding portion includes folding the third folding portion in the direction toward the inner face about an intersection between the third folding portion and the fourth folding portion.

The present invention will become clearer in light of the following detailed description of illustrative embodiments of this invention described in connection with the drawings.

DETAILED DESCRIPTION OF THE INVENTION

Figure 1:
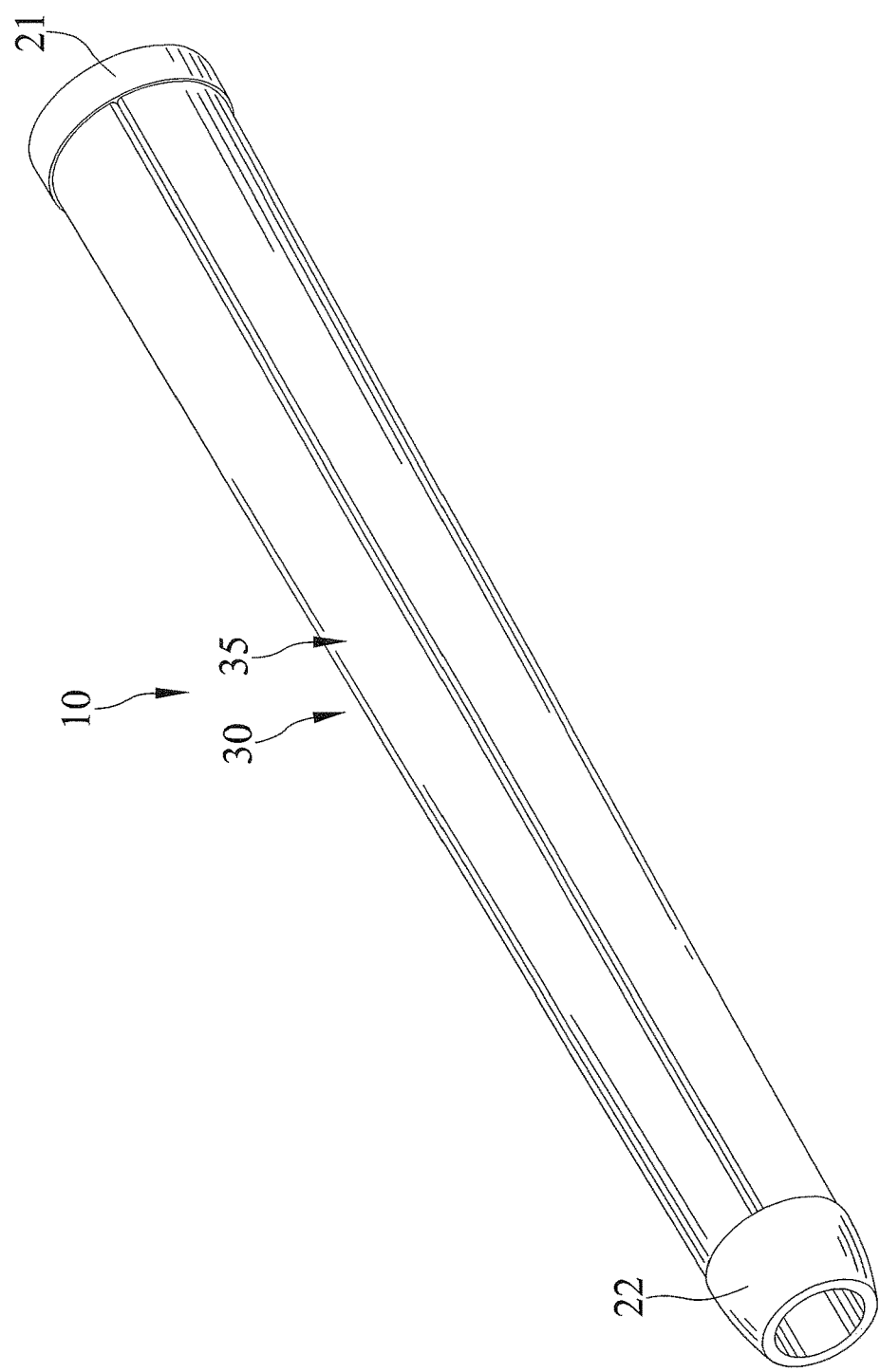
FIG. 1 is a perspective view of a slip-proof grip sleeve of an embodiment according to the present invention.
Figure 2:
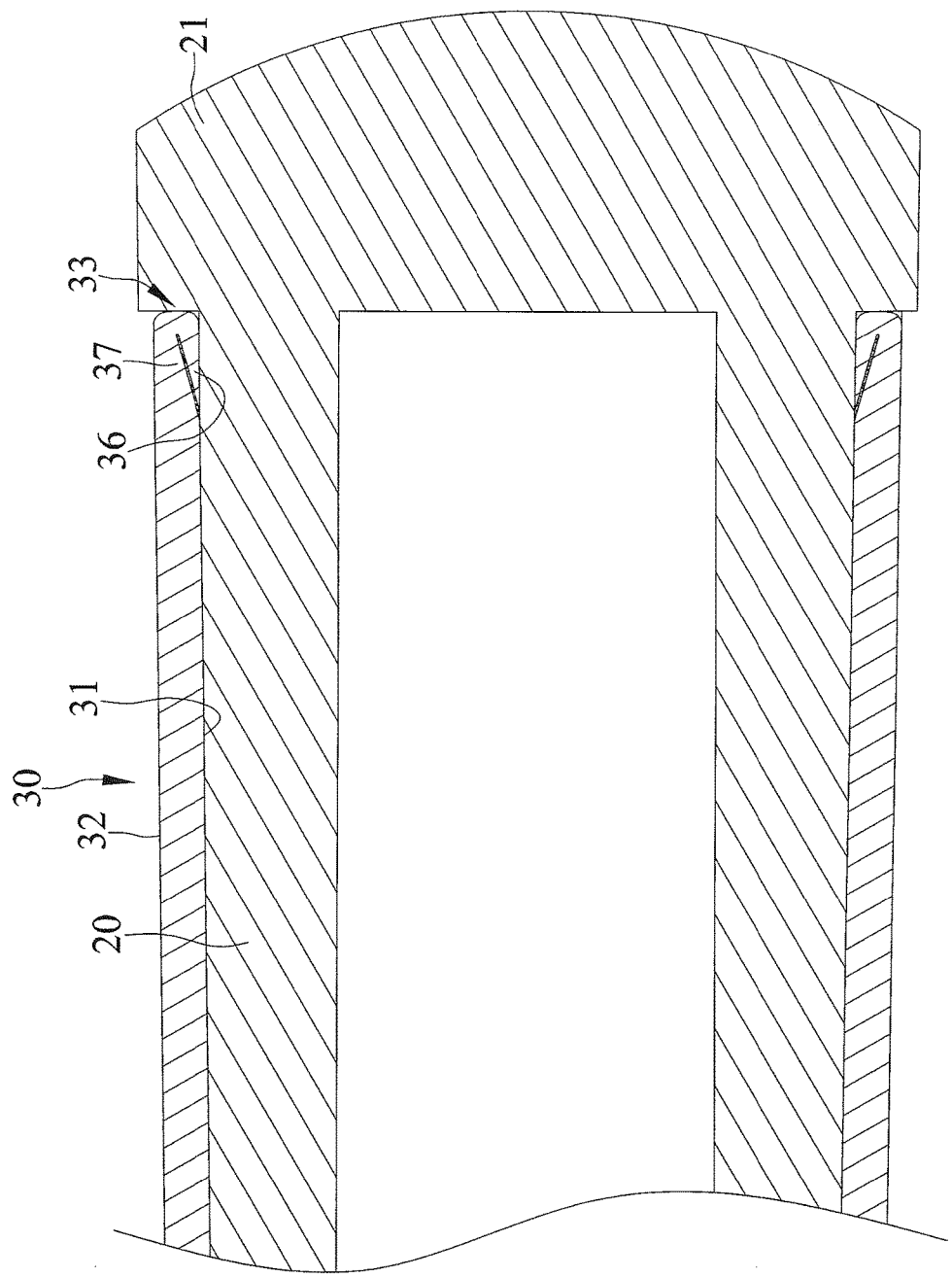
FIG. 2 is an enlarged view of a rear end of the slip-proof grip sleeve of FIG. 1.
Figure 3:
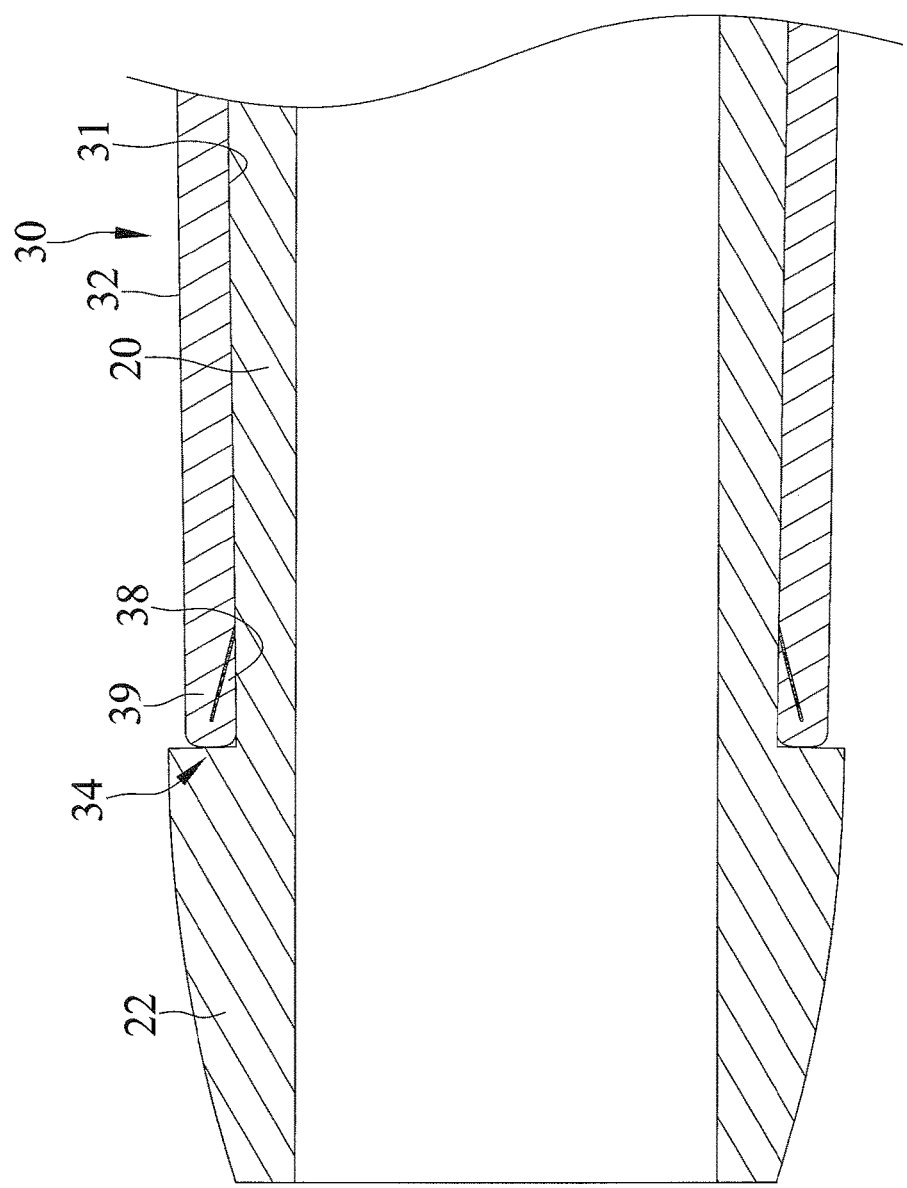
FIG. 3 is an enlarged view of a front end of the slip-proof grip sleeve of FIG. 1.

With reference to FIGS. 1-3, a slip-proof grip sleeve 10 of an embodiment according to the present invention includes a lining tube 20 and a slip-proof strip 30.

The lining tube 20 is a hollow cylindrical tube. A rear cap 21 is mounted to an end of the lining tube 20. A maximum width of the rear cap 21 in a diametric direction is larger than a maximum width of the lining tube 20 in the diametric direction. A ring 22 is mounted to another end of the lining tube 20 opposite to the rear cap 21. A maximum width of the ring 22 in the diametric direction is larger than the maximum width of the lining tube 20 in the diametric direction. The lining tube 20, the rear cap 21 and the ring 22 are an integrated structure.

The slip-proof strip 30 includes an inner face 31 and an outer face 32 opposite to the inner face 31. The slip-proof strip 30 further includes a rear end 33 and a front end 34 opposite to the rear end 33. The slip-proof strip 30 further includes a gripping portion 35 between the rear end 33 and the front end 34. The slip-proof strip 30 further includes a first folding portion 36 adjacent to the rear end 33 and a second folding portion 37 at a side of the first folding portion 36 adjacent to the gripping portion 35. The first folding portion 36 and the second folding portion 37 are contiguous to each other. Each of a thickness of the first folding portion 36 and a thickness of the second folding portion 37 is smaller than a thickness of the gripping portion 35. The first folding portion 36 of the slip-proof strip 30 is folded in the direction toward the inner face 31 along an intersection between the first folding portion 36 and the second folding portion 37. The first folding portion 36 and the second folding portion 37 overlap with each other. The first folding portion 36 and the second folding portion 37 are glued together by glue disposed therebetween.

The slip-proof strip 30 includes a third folding portion 38 adjacent to the front end 34 and a fourth folding portion 39 at a side of the third folding portion 38 adjacent to the gripping portion 35. The third folding portion 38 and the fourth folding portion 39 are contiguous to each other. Each of a thickness of the third folding portion 38 and a thickness of the fourth folding portion 39 is smaller than the thickness of the gripping portion 35. The third folding portion 38 of the slip-proof strip 30 is folded in the direction toward the inner face 31 along an intersection between the third folding portion 38 and the fourth folding portion 39. The third folding portion 38 and the fourth folding portion 39 overlap with each other. The third folding portion 38 and the fourth folding portion 39 are glued together by glue therebetween.

The slip-proof strip 30 is rolled to form a cylindrical tube, with the inner face 31 facing inward and with two opposite sides of the slip-proof strip 30 connected to each other. The slip-proof strip 30 is mounted around an outer periphery of the lining tube 20. The rear end 33 of the slip-proof strip 30 abuts the rear cap 21 by the outer face 32. The rear end 33 of the slip-proof strip 30 does not overlap with the rear cap 21. A maximum width of the rear end 33 of the slip-proof strip 30 in the diametric direction is smaller than the maximum width of the rear cap 21 in the diametric direction. The front end 34 of the slip-proof strip 30 abuts the ring 22 by the outer face 32. The front end 34 of the slip-proof strip 30 does not overlap with the ring 22. A maximum width of the front end 34 of the slip-proof strip 30 in the diametric direction is smaller than the maximum width of the ring 22 in the diametric direction.

Figure 4:
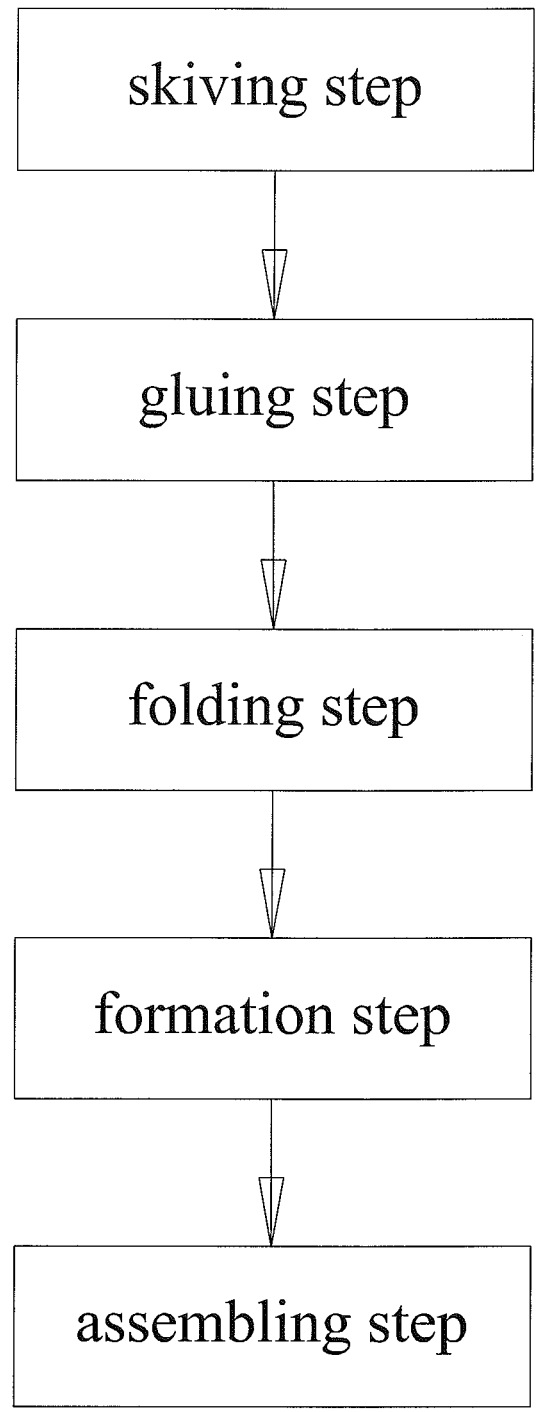
FIG. 4 is a flowchart illustrating a method for making a slip-proof grip sleeve according to the present invention.

With reference to FIG. 4, a method for making a slip-proof grip sleeve 10 includes a skiving step, a gluing step, a folding step, a formation step, and an assembling step.

Figure 5:
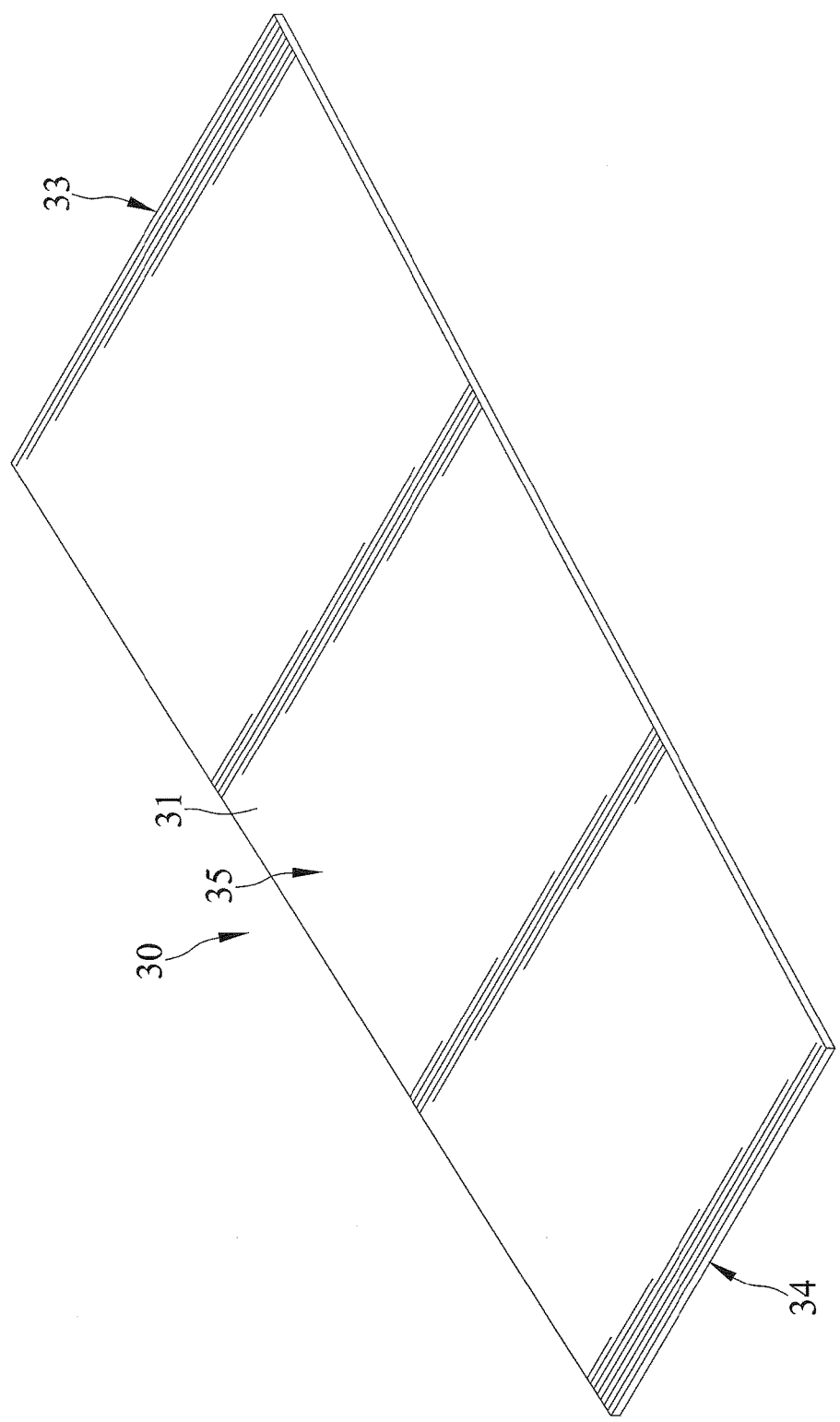
FIG. 5 is a perspective view illustrating a slip-proof piece before a skiving step and a gluing step of the method according to the present invention.
Figure 6:
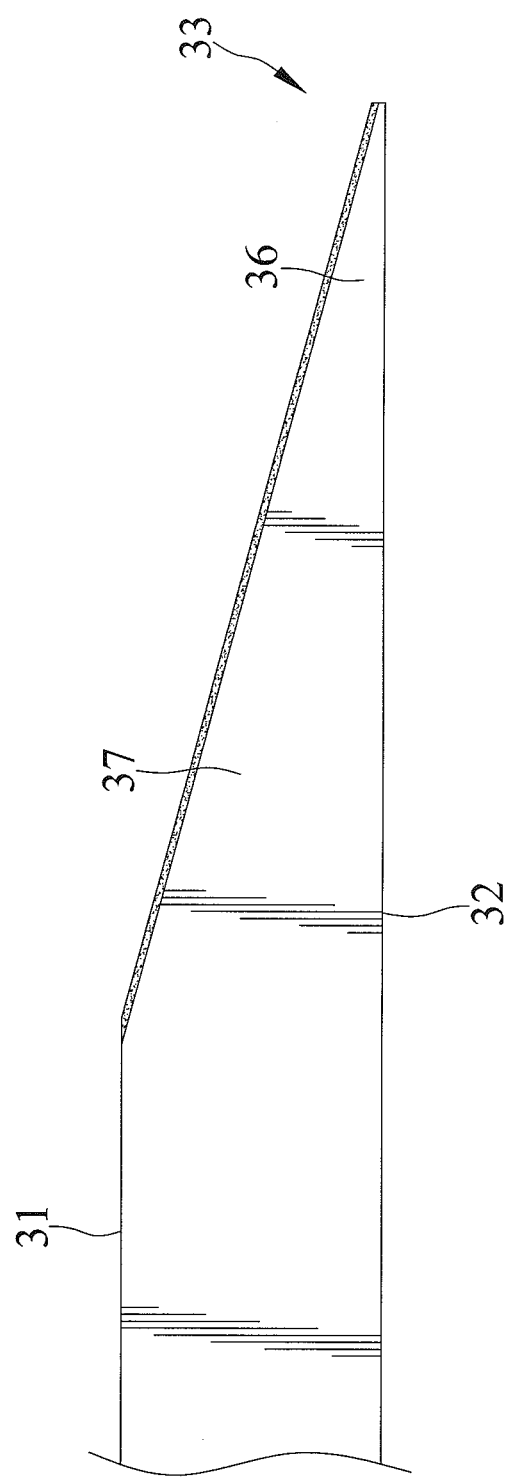
FIG. 6 is a partial, side view of the slip-proof piece of FIG. 5 after the skiving step and the gluing step.
Figure 7:
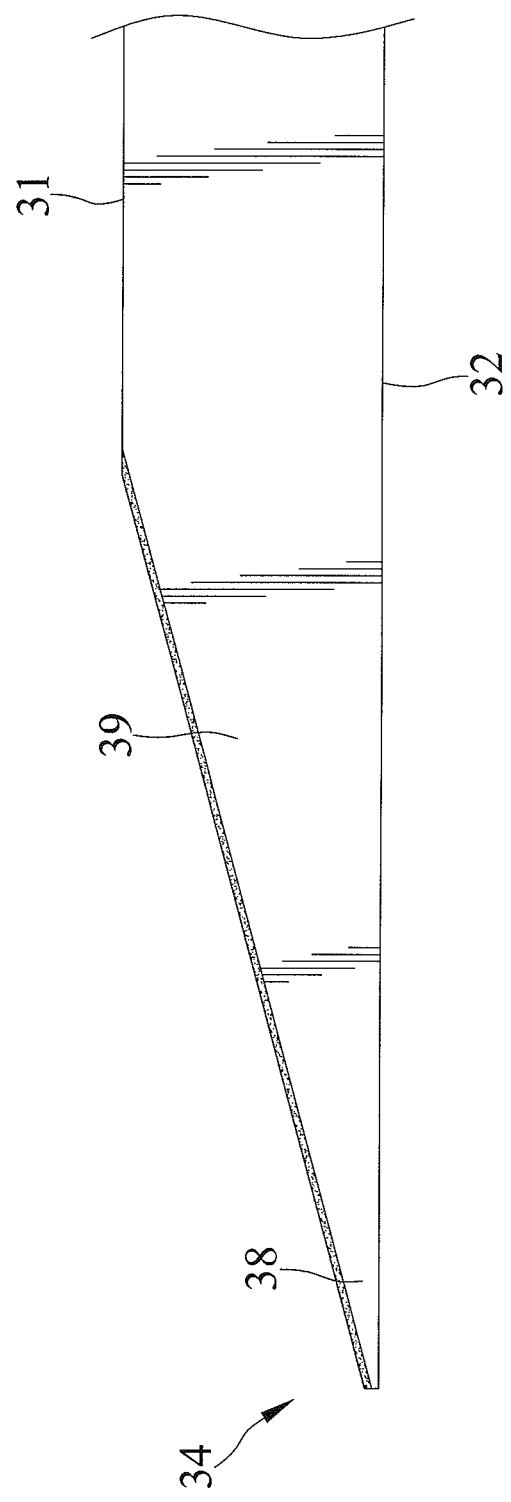
FIG. 7 is another partial, side view of the slip-proof piece of FIG. 5.

With reference to FIGS. 5-7, a slip-proof strip 30 is firstly prepared. The slip-proof strip 30 includes an inner face 31 and an outer face 32 opposite to the inner face 31. The slip-proof strip 30 further includes a rear end 33 and a front end 34 opposite to the rear end 33. The slip-proof strip 30 further includes a gripping portion 35 between the rear end 33 and the front end 34.

The skiving step includes skiving the slip-proof strip 30 at a location adjacent to the rear end 33 of the slip-proof strip 30, forming a first folding portion 36 and a second folding portion 37 at a side of the first folding portion 36 adjacent to the gripping portion 35. Each of a thickness of the first folding portion 36 and a thickness of the second folding portion 37 is smaller than a thickness of the gripping portion 35. The first folding portion 36 and the second folding portion 37 are contiguous to each other.

The skiving step further includes skiving the inner face 31 of the slip-proof strip 30 at another location adjacent to the front end 34 of the slip-proof strip 30, forming a third folding portion 38 and a fourth folding portion 39 at a side of the third folding portion 38 adjacent to the gripping portion 35. Each of a thickness of the third folding portion 38 and a thickness of the fourth folding portion 39 is smaller than the thickness of the gripping portion 35. The third folding portion 38 and the fourth folding portion 39 are contiguous to each other.

The gluing step includes applying glue to at least one of a side of the first folding portion 36 adjacent to the inner face 31 and a side of the second folding portion 37 adjacent to the inner face 31, and apply glue to at least one of a side of the third folding portion 38 adjacent to the inner face 31 and a side of the fourth folding portion 39 adjacent to the inner face 31.

Figure 8:
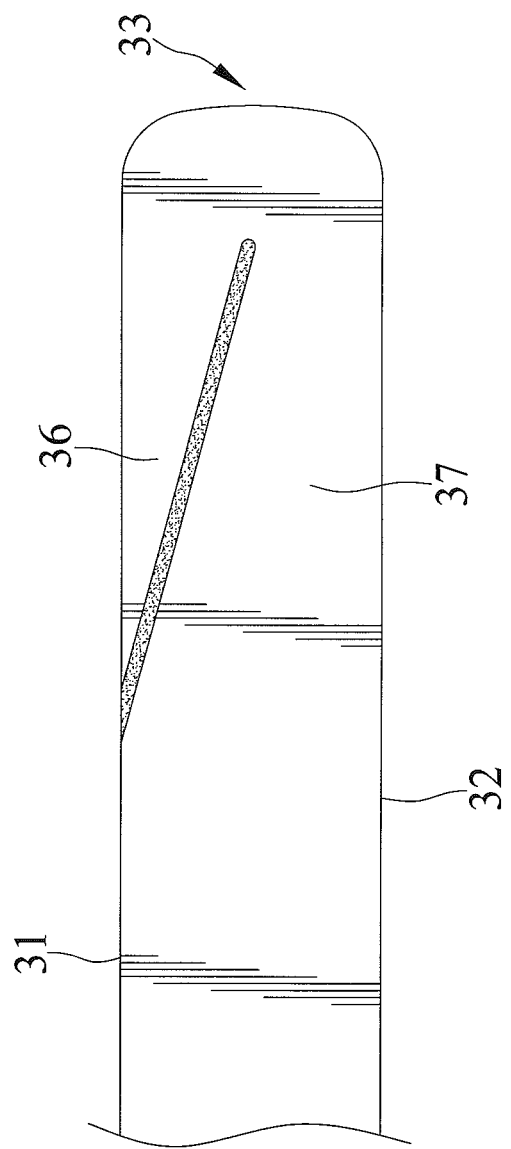
FIG. 8 is a partial, side view illustrating the slip-proof piece after a folding step.
Figure 9:
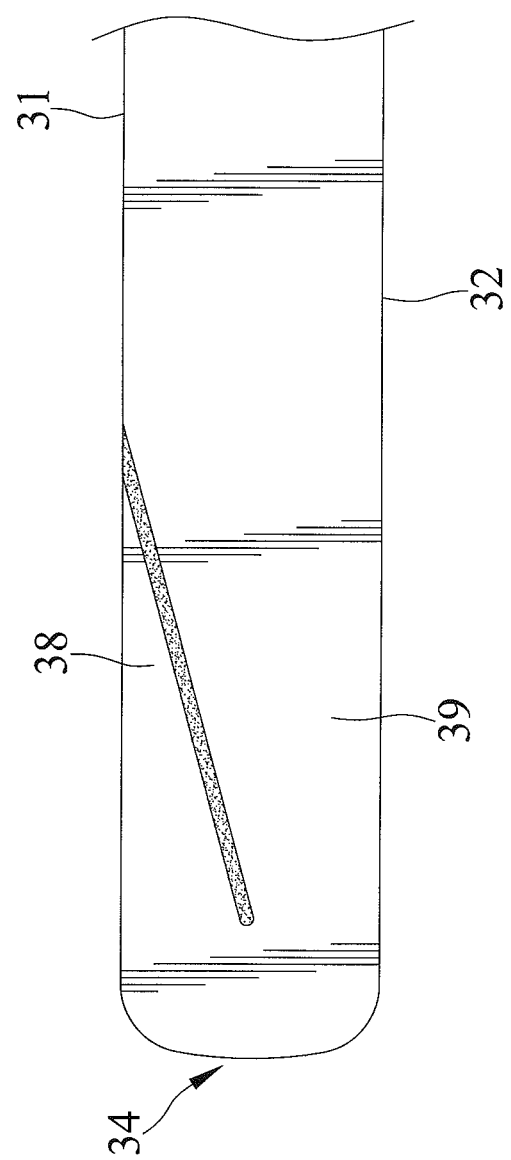
FIG. 9 is another partial, side view illustrating the slip-proof piece after a folding step.

With reference to FIGS. 8 and 9, the folding step includes folding the first folding portion 36 along an intersection between the first folding portion 36 and the second folding portion 37 in a direction toward the inner face 31 to overlap the first folding portion 36 with the second folding portion 37. The folding step further includes folding the third folding portion 38 along an intersection between the third folding portion 38 and the fourth folding portion 39 in the direction toward inner face 31 to overlap the third folding portion 38 with the fourth folding portion 39.

Figure 10:
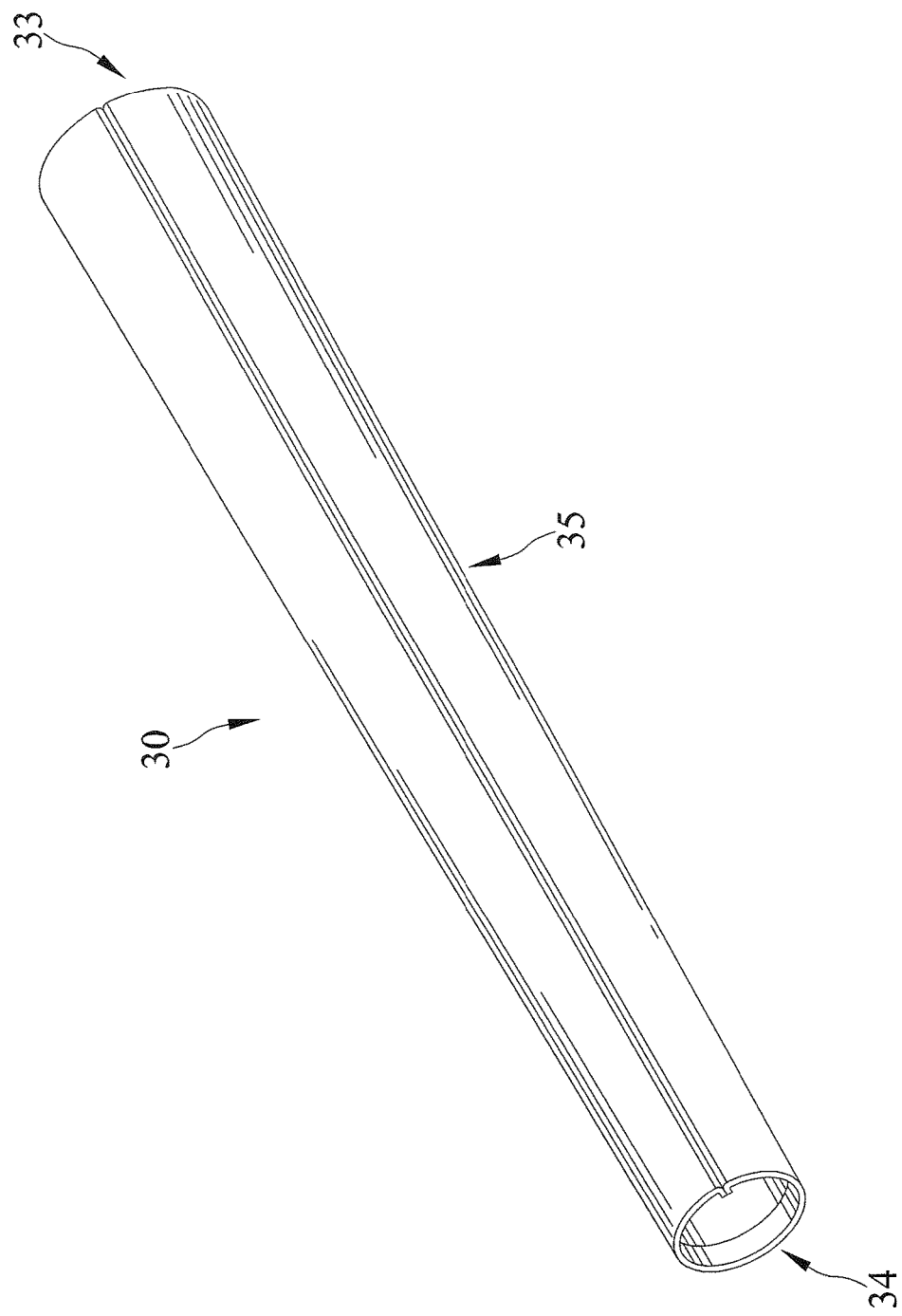
FIG. 10 is a perspective view of the slip-proof piece after a formation step.

With reference to FIG. 10, the formation step includes rolling the slip-proof strip 30 into a tube, with the inner face 31 forming an inner periphery of the tube, and with two opposite sides of the slip-proof strip 30 interconnected to each other.

The assembling step includes mounting a rear cap 21 to an end of the lining tube 20 (see FIGS. 2 and 3) and mounting a ring 22 to another end of the lining tube 20 opposite to the rear cap 21 (See FIG. 3). The rear cap 21 and the ring 22 are an integrated structure. The slip-proof strip 30 is mounted around an outer periphery of the lining tube 20, with the rear end 33 of the slip-proof strip 30 abutting the rear cap 21 by the outer face 32, and with the front end 34 of the slip-proof strip 30 abutting the ring 22 by the outer face 32.

The slip-proof grip sleeve 10 (see FIG. 1) is, thus, produced by the above method without an edge sealing procedure and without the risk of generation of burrs at the edge of the slip-proof strip 30. The slip-proof strip 30 is simple in structure and is easy to process, effectively reducing the processing time.

Although specific embodiments have been illustrated and described, numerous modifications and variations are still possible without departing from the scope of the invention. The scope of the invention is limited by the accompanying claims.

The invention claimed is:

1. A method for making a slip-proof grip sleeve, comprising:
   preparing a slip-proof strip, wherein the slip-proof strip includes an inner face and an outer face opposite to the inner face, wherein the slip-proof strip further includes a rear end and a front end opposite to the rear end, wherein the slip-proof strip further includes a gripping portion between the rear end and the front end;
   skiving the inner face of the slip-proof strip at a location adjacent to the rear end of the slip-proof strip, forming a first folding portion and a second folding portion at a side of the first folding portion adjacent to the gripping portion, wherein each of a thickness of the first folding portion and a thickness of the second folding portion is smaller than a thickness of the gripping portion;
   skiving the inner face of the slip-proof strip at another location adjacent to the front end of the slip-proof strip, forming a third folding portion and a fourth folding portion at a side of the third folding portion adjacent to the gripping portion, wherein each of a thickness of the third folding portion and a thickness of the fourth folding portion is smaller than the thickness of the gripping portion;
   applying glue to at least one of a side of the first folding portion adjacent to the inner face and a side of the second folding portion adjacent to the inner face, and applying glue to at least one of a side of the third folding portion adjacent to the inner face and a side of the fourth folding portion adjacent to the inner face; and folding the first folding portion in a direction toward the inner face to overlap the first folding portion with the second folding portion, and folding the third folding portion in the direction toward inner face to overlap the third folding portion with the fourth folding portion.

2. The method for making the slip-proof grip sleeve as claimed in claim 1, further comprising rolling the slip-proof strip into a tube, with the inner face forming an inner periphery of the tube, with two opposite sides of the slip-proof strip interconnected to each other.

3. The method for making the slip-proof grip sleeve as claimed in claim 2, further comprising an assembling step including mounting a rear cap to an end of a lining tube; mounting a ring to another end of the lining tube opposite to the rear cap, wherein the lining tube, the rear cap and the ring are an integrated structure; and mounting the slip-proof strip around an outer periphery of the lining tube, with the rear end of the slip-proof strip abutting the rear cap by the outer face, and with the front end of the slip-proof strip abutting the ring by the outer face.

4. The method for making the slip-proof grip sleeve as claimed in claim 3, wherein in the assembling step the lining tube is a hollow cylindrical tube, wherein a maximum width of the rear cap in a diametric direction is larger than a maximum width of the lining tube in the diametric direction, wherein a maximum width of the ring in the diametric direction is larger than the maximum width of the lining tube in the diametric direction, wherein the rear end of the slip-proof strip does not overlap with the rear cap, wherein the front end of the slip-proof strip does not overlap with the ring, wherein a maximum width of the rear end of the slip-proof strip in the diametric direction is smaller than the maximum width of the rear cap in the axial direction, and wherein a maximum width of the front end of the slip-proof strip in the diametric direction is smaller than the maximum width of the ring in the diametric direction.

5. The method for making the slip-proof grip sleeve as claimed in claim 1, wherein the first folding portion and the second folding portion are contiguous to each other, wherein the third folding portion and the fourth folding portion are contiguous to each other, wherein folding the first folding portion includes folding the first folding portion in the direction toward the inner face about an intersection between the first folding portion and the second folding portion, wherein folding the third folding portion includes folding the third folding portion in the direction toward the inner face about an intersection between the third folding portion and the fourth folding portion.

* * * * *